US011483341B2

(12) United States Patent
Wei et al.

(10) Patent No.: US 11,483,341 B2
(45) Date of Patent: Oct. 25, 2022

(54) DDOS ATTACK DETECTION AND MITIGATION METHOD FOR INDUSTRIAL SDN NETWORK

(71) Applicant: CHONGQING UNIVERSITY OF POSTS AND TELECOMMUNICATIONS, Chongqing (CN)

(72) Inventors: Min Wei, Chongqing (CN); Tao Yang, Chongqing (CN); Jiuchao Mao, Chongqing (CN); Qiaoyue Pang, Chongqing (CN); Ping Wang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 351 days.

(21) Appl. No.: 16/629,964

(22) PCT Filed: Mar. 6, 2018

(86) PCT No.: PCT/CN2018/078082
§ 371 (c)(1),
(2) Date: Jan. 10, 2020

(87) PCT Pub. No.: WO2019/148576
PCT Pub. Date: Aug. 8, 2019

(65) Prior Publication Data
US 2021/0092153 A1 Mar. 25, 2021

(30) Foreign Application Priority Data
Feb. 5, 2018 (CN) .......................... 201810112193.8

(51) Int. Cl.
*H04L 9/40* (2022.01)
*H04L 47/10* (2022.01)
*H04L 29/06* (2006.01)

(52) U.S. Cl.
CPC .......... *H04L 63/1458* (2013.01); *H04L 47/29* (2013.01); *H04L 63/1416* (2013.01)

(58) Field of Classification Search
CPC ............. H04L 63/1458; H04L 63/1416; H04L 63/14; H04L 63/1408; H04L 63/1425; H04L 63/1441; H04L 63/16
See application file for complete search history.

(56) References Cited

U.S. PATENT DOCUMENTS

2009/0316628 A1* 12/2009 Enns ........................ H04L 69/08
370/328
2014/0189867 A1* 7/2014 Jung .................... H04L 63/1458
726/23

(Continued)

FOREIGN PATENT DOCUMENTS

| CN | 106341337 A | 1/2017 |
| CN | 106572107 A | 4/2017 |

(Continued)

OTHER PUBLICATIONS

International Search Report for PCT/CN2018/078082 dated Oct. 11, 2018, ISA/CN.

*Primary Examiner* — Edward Zee
(74) *Attorney, Agent, or Firm* — Yue (Robert) Xu; Apex Attorneys at Law, LLP

(57) ABSTRACT

The present invention relates to a DDoS attack detection and mitigation method for an industrial SDN network, and belongs to the field of network security. According to the method, by means of the cooperation between an east-west interface of an SDN controller in an industrial backhaul network and a system manager of an industrial access network, in conjunction with the features of the industrial (Continued)

backhaul network and an industrial access network data packet, a flow entry matching field of an OpenFlow switch is extended, and a flow table 0 is set to be a "flow table dedicated to DDoS attack mitigation" for defending against an attacking data flow in a timely manner. By using the SDN controller of an industrial backhaul network and a DDoS attack detection and mitigation system, an attacking data flow is identified and a DDoS attack source is found, and the policy of mitigating a DDoS attack is implemented by means of scheduling a system manager of the industrial access network. According to the present invention, the normal traffic of an industrial backhaul network and an industrial access network is ensured, and a threat posed by a DDoS attack to the security of an industrial network is overcome.

7 Claims, 6 Drawing Sheets

(56) References Cited

U.S. PATENT DOCUMENTS

| 2015/0081922 A1* | 3/2015 | Brett | H04W 8/245 |
|---|---|---|---|
| | | | 709/230 |
| 2017/0111397 A1 | 4/2017 | Jain | |
| 2018/0109556 A1* | 4/2018 | Yoo | H04L 63/1458 |
| 2018/0235026 A1 | 8/2018 | Wang et al. | |

FOREIGN PATENT DOCUMENTS

| CN | 106685832 A | 5/2017 |
|---|---|---|
| CN | 107438066 A | 12/2017 |

\* cited by examiner

DDOS ATTACK DETECTION AND MITIGATION METHOD FOR INDUSTRIAL SDN NETWORK

CROSS-REFERENCE TO RELATED APPLICATIONS

The present application is the US national phase of International Application No. PCT/CN2018/078082, titled "DDOS ATTACK DETECTION AND MITIGATION METHOD FOR INDUSTRIAL SDN NETWORK", filed on Mar. 6, 2018, which claims priority to Chinese Patent Application No. 201810112193.8, titled "DDOS ATTACK DETECTION AND MITIGATION METHOD FOR INDUSTRIAL SDN NETWORK", filed on Feb. 5, 2018 with the China National Intellectual Property Administration, both of which are incorporated herein by reference in their entirety.

FIELD

The present disclosures relates to the technical field of network security, and in particular to a DDoS attack detection and mitigation method for an industrial SDN network.

BACKGROUND

Software Defined Network (SDN) technology is getting more and more attention, and SDN is gradually introduced into an industrial network environment in an increasing number of researches. The SDN is featured by separating a data forwarding plane from a control plane of a network, thereby implementing programmable control of underlying hardware by a software platform of a controller, and realizing flexible on-demand deployment of network resources. A flow table is sent, by a SDN controller, to an OpenFlow switch (hereinafter abbreviated as an OF switch) proactively or passively by using an OpenFlow protocol, and a data packet is forwarded by matching the flow table. By utilizing advantages of centralized control and programmability of SDN, a traffic control of a large industrial network system can be more flexible, and manual configuration of an underlying layer can be reduced.

An industrial backhaul network is a transmission network between a wide area network (Internet network) and an access network (such as wireless WirelessHART, WIA-PA, ISA100.11a), coverage of which ranges from several square kilometers to several tens of square kilometers. The industrial backhaul network is a medium-sized network that is used to solve the transmission problem of the "last few kilometers" of the industrial wireless network accessing the wide area network. At present, the resource scheduling for industrial access networks and industrial backhaul networks is mainly by cooperative and joint scheduling of the SDN controller and the industrial access network system controller to effectively realize the effective allocation of resources.

In terms of network security, the current DDoS attacks against industrial SDN networks mainly exist in the following two forms:

(1) The attacker conducts DDoS attacks on the OF switch of the industrial backhaul network by using the OF switch to generate a large amount of unmatched packet-in information to attack the SDN controller, causing the SDN controller to crash due to swarming in of the large amount of packet-in information. As a result, normal packet requests cannot be processed in time.

(2) The attacker conducts DDoS attacks on key network devices such as industrial access networks (industrial wired networks, industrial wireless networks such as WirelessHART, WIA-PA, ISA100.11a) routing nodes, resulting in swarming of a large amount of invalid data packets into the industrial access networks and industrial backhaul networks, and thereby affecting normal operation of the network.

At present, there are many methods for detecting DDoS attacks on ordinary SDN networks, including traffic-based time feature methods, information entropy-based methods, and KNN-based algorithms. However, due to the characteristics of the industrial backhaul network and the industrial control network, the network characteristics, real-time requirements, and reliability requirements of the industrial network are not considered, and the OpenFlow protocol of the ordinary SDN network is not matched and improved especially for the industrial network. Existing research achievements are difficult to apply directly to industrial SDN networks. In particular, when DDoS attacks erupt in some industrial access networks (such as WIA-PA networks, WirelessHART networks, etc.) that do not support IP, it is difficult to trace and locate the actual location of the attack by using the traditional OpenFlow flow table pattern matching method or the information entropy value method.

SUMMARY

In view of this, an object of the present disclosure is to provide a method for detecting and mitigating Distributed Denial of Service (DDoS) attacks in industrial software defined networks (SDN), which utilizes an SDN controller in an industrial SDN network and an industrial access network system manager and extends a matching field of a flow entry of an OF switch in an industrial backhaul network, enabling it to more accurately match data packets from the industrial access network. The SDN controller interacts with a DDoS attack detection and mitigation server to detect and mitigate DDoS attacks in industrial backhaul networks and industrial access networks.

In order to achieve the above object, the present disclosure provides the following technical solutions:

A method for detecting and mitigating DDoS attacks in industrial SDN, including:

step S1: establishing a DDoS detection and mitigation system architecture for industrial network based on SDN joint scheduling architecture;

step S2: forwarding, by an industrial access network, a data message to an industrial backhaul network in normal network operation;

step S3: improving and extending flow entries of OpenFlow flow entry;

step S4: performing flow table matching when data is transmitted through an OpenFlow (OF) switch;

step S5: querying a matching status of the OF switch, marking a suspicious flow entryflow entry and reporting a packet-in message, by an SDN controller; and step S6: processing the suspicious flow entry, or identifying the packet-in message, by a DDoS attack detection and mitigation system.

Further, the DDoS detection system architecture for industrial network based on SDN joint scheduling architecture in the step S1 includes an application plane, a control plane and a forwarding plane;

the application plane incudes control software of the SDN controller and anti-DDoS attack application management software, where the control software of the SDN controller is configured to configure the SDN controller for a user; and the anti-DDoS attack application management software is configured to support security personnel to formulate a corresponding defense strategy according to characteristic of a network DDoS attack to ensure secure network operation;

the control plane includes the SDN controller, an industrial access network system manger, and the DDoS attack detection and mitigation system for an industrial SDN network, where the SDN controller is responsible for controlling and scheduling of resources of the industrial backhaul network, network link discovery topology management, status monitoring, strategy formulating and issuance of flow tables of, and provides monitored information for query of the DDoS attack detection and mitigation system, wherein a joint scheduler that runs on the SDN controller is responsible for industrial access network system manager interaction and computation and decision-making of a data transmission path and resource information of the industrial access network;

the industrial access network system manger is responsible for configuring a network attribute of the industrial access network, managing a routing table, communications between scheduling devices, monitoring network performance and security management; and responsible for managing operation of devices in the network and communications of an entire wireless network, which includes device access and off-grid, monitoring and reporting of network failures, and communications configuration management; and the DDoS attack detection and mitigation system for an industrial SDN network includes a detection module and a mitigation module, the detection module is configured to analyze real-time data sent by an industrial network to the OpenFlow switch based on status monitoring information of the SDN controller, extract a corresponding data characteristic, determine whether a DDoS attack is received and report a determination result to a DDoS attack mitigation system, and the mitigation module is responsible for fast response to DDoS attacks in the network and scheduling traffic in the industrial network through the SDN controller;

the forwarding plane includes the OF switch in the industrial backhaul network and a network device of the industrial access network, where the OF switch is located in the industrial backhaul network and relies on a global view function of the SDN controller to implement flexible and efficient configuration of the industrial backhaul network; and the network device of the industrial access network is a network transmission physical entity of the industrial access network, and provides management and configuration of the industrial access network system manager to achieve network functions required by the industrial access network system manager, where the network device of the industrial access network includes an border router of the industrial access network, and the border router of the industrial access network is responsible for processing a message and forwarding the processed message to the industrial backhaul network.

Further, the step S2 includes: supporting, by a gateway, conversion of an industrial wired protocol and an industrial wireless protocol to IPv4 or IPv6 protocol when an access network routing device sends a data packet to the border router; and retaining following characteristics of original data: an access network type, a network protocol, a PAN_ID, an operating channel, a source MAC address, a destination MAC address, and a source device ID.

Further, the step S3 includes: extending a matching field of a flow entry of the OpenFlow switch by adding an extended field, to enable the OpenFlow switch to more accurately match data packets from the industrial access network; and obtaining, by the controller, a link status after the OpenFlow switch is network-connected, and issuing the extended flow table to the switch proactively; where the extended field includes:

an access network type, used to mark whether the industrial access network is a wired network or a wireless network;

a network protocol, a network protocol for marking industrial access networks;

a PAN_ID, ID used to mark a personal area network;

an operating channel, used to mark a channel involved in a data transmission when data comes from a wireless access network;

a wireless network source MAC address, marking a source MAC address of data;

a wireless network destination MAC address, marking a destination MAC address of data; and a source Device ID, used to mark a data source.

Further, the step S4 includes:

in a case that a data flow matches a matching field in a flow table: counting, by a counter in the flow entry, once for each matching of the flow entry;

in a case that the data flow does not match the matching field in the flow table: caching, by the OF switch, the data flow in a buffer; extracting a header of the data flow and packaging the header of the data flow into the packet-in message; packaging, in a case that the buffer is full, an entire data packet into the packet-in message; sending the packet-in message to the SDN controller for analysis and decision-making of the SDN controller, and processing by issuing a flow-mod or a packet-out message.

Further, the step S5 includes:

step S501: querying, by the SDN controller, the number M of matching data flows of each flow entry per unit time, setting, by the controller, the number M* of normal data flows matched by each flow entry per unit time according to an empirical value, and calculating M−M*=ΔM; step S502: querying, by the SDN controller, the number N of packet-in messages per unit time and a sum of the number N* of flow-mod messages and packet-out messages per unit time, and calculating N−N*=ΔN;

step S503: marking, if ΔM of a flow entry exceeds a threshold, the flow entry as the suspicious flow entry by the SDN controller;

step S504: determining, if ΔN currently sent by the OpenFlow switch to the SDN controller exceeds a threshold, that there is an abnormal data flow, by the SDN controller;

step S505: setting, by a user through the anti-DDoS attack application management software, flow table mismatch tolerances ΔM and ΔN in the OF switch of the industrial backhaul network;

step S506: reporting, by the SDN controller, the suspicious flow entry to the DDoS attack detection and mitigation system; and step S507: reporting, by the SDN controller, the packet-in message carrying an access network type, a network protocol, a PAN_ID, an operating channel, a source MAC address, a destination MAC address, and a source device ID to the DDoS attack detection and mitigation system, and determining, by the DDoS attack detection and mitigation system, whether the packet-in message is normal traffic, normal burst traffic, DDoS attack traffic or low-rate DDoS (L-DDoS) attack traffic.

Further, in the step S6, the processing the suspicious flow entry by the DDoS attack detection and mitigation system includes: notifying, by the DDoS attach detection and mitigation system, an industrial access network system manager of the suspicious flow entry; and reallocating, by the industrial access network system manager, network resources and formulating a corresponding attack mitigation strategy to block continued communications of a DDoS attack source device within the industrial access network.

Further, in the step S6, the identifying and processing the packet-in message by the DDoS attack detection and mitigation system includes:

step S601: data sample training and modeling: training and modeling, by the DDoS attack detection and mitigation system, normal data of the industrial access network and the industrial backhaul network, and training and modeling data samples that includes normal traffic, normal burst traffic, DDoS attack traffic and L-DDoS attack traffic after introducing characteristics of the industrial network, including:

step S601-1: selecting mismatch tolerances ΔM and ΔN as a root node according to a C4.5 decision tree algorithm;

Step S601-2: blurring and discretizing, according to a traffic characteristic performance value table of the industrial access network, traffic characteristics into three characteristic degree values X, Y and Z; and making statistics of data flow samples and finding values of X, Y and Z; where when the traffic characteristic is an IPv6/IPv4 source address, X means known and common, Y means weak random variation, and Z means strong random variation;

when the traffic characteristic is a TCP source port, X means known and common, Y means weak random variation, and Z means strong random variation;

when the traffic characteristic is a UDP source port, X means known and common, Y means weak random variation, and Z means strong random variation;

when the traffic characteristic is a network protocol, X means an access network protocol, Y means null, and Z means an unknown protocol;

when the traffic characteristic is a source device ID, X means known and common, Y means weak random variation, and Z means strong random variation;

when the traffic characteristic is a source MAC address, X means known and common, Y means weak random variation, and Z means strong random variation;

when the traffic characteristic is an operating channel, X means the operating channel has a high channel quality, Y means the operating channel has a centered channel quality, and Z means the operating channel has a low channel quality;

when the traffic characteristic is ΔM and ΔN, X means both ΔM and ΔN are within a threshold, Y means one of ΔM and ΔN is within the threshold, and Z means neither of ΔM and ΔN is within the threshold;

step S601-3: generating a decision tree:

1) selecting an attribute in an X direction of the root node, including:

1a) counting, vertically, Z in data flow characteristic values, and determining an attribute corresponding to a maximum number of Z as a child node of the root node in the X direction;

1b) in a case that there is no Z, counting Y in the data flow characteristic values, comparing the numbers of Y with each other, and determining an attribute corresponding to a maximum number of Y as the child node of the root node in the X direction;

1c) in a case that there is no Y, counting X in the data flow characteristic values, comparing the numbers of X with each other, and determining an attribute corresponding to a maximum number of X as the child node of the root node in the X direction; and 1d) in a case that two or more attributes corresponding to a same number of Z, Y or X, selecting, randomly, one attribute in the two or more attributes as the child node of the root node in the X direction;

2) selecting an attribute in a Y direction of the root node, including:

2a) counting, vertically, Z in data flow characteristic values, and determining an attribute corresponding to a maximum number of Z as a child node of the root node in the Y direction;

2b) in a case that there is no Z, counting Y in the data flow characteristic values, comparing the numbers of Y with each other, and determining an attribute corresponding to a maximum number of Y as the child node of the root node in the Y direction;

2c) in a case that there is no Y, counting X in the data flow characteristic values, comparing the numbers of X with each other, and determining an attribute corresponding to a maximum number of X as the child node of the root node in the Y direction; and 2d) in a case that two or more attributes corresponding to a same number of Z, Y or X, selecting, randomly, one attribute in the two or more attributes as the child node of the root node in the Y direction;

3) selecting an attribute in a Z direction of the root node, including:

3a) counting, vertically, Z in data flow characteristic values, and determining an attribute corresponding to a maximum number of Z as a child node of the root node in the Z direction;

3b) in a case that there is no Z, counting Y in the data flow characteristic values, comparing the numbers of Y with each other, and determining an attribute corresponding to a maximum number of Y as the child node of the root node in the Z direction;

3c) in a case that there is no Y, counting X in the data flow characteristic values, comparing the numbers of X with each other, and determining an attribute corresponding to a maximum number of X as the child node of the root node in the Z direction; and 3d) in a case that two or more attributes corresponding to a same number of Z, Y or X, selecting, randomly, one attribute in the two or more attributes as the child node of the root node in the Z direction;

where at this point, attribute classification of X, Y and Z branches of the root node is completed and second-layer nodes are formed;

generating third-layer nodes in a same way as the second-layer nodes by selecting attributes of the second-layer nodes in the X, Y and Z directions, respectively; and generating decision tree models for four data classification subsets including a normal traffic data classification subset, a normal burst traffic data classification subset, a DDoS attack traffic data classification subset and a L-DDoS attack traffic data classification subset, respectively;

step S602: identifying by the DDoS attack detection and mitigation system, including: putting the packet-in message into a training sample model in step S701 for determination, and obtaining a classification of the packet-in message;

step S603: processing by the DDoS attack detection and mitigation system, including:
- step S603-1: identifying, by the DDoS attack detection and mitigation system, a normal data flow and normal burst traffic cached in the OF switch in steps S701 and S702, forwarding, by the SDN controller, the data flow cached in the OF switch, and forwarding a normal data flow that is not cached in the OF switch directly through an output port of the OF switch; recording relevant characteristics of an identified DDoS attack data flow and an identified L-DDoS attack data flow, writing the relevant characteristics of the identified DDoS attack data flow and the identified L-DDoS attack data flow into a "dedicated flow entry for attack mitigation" which is set to the highest priority, and issuing the "dedicated flow entry for attack mitigation" to a flow table 0 of the OF switch to block, in a timely manner, data packets that an attack source continues to send;
- step S603-2: notifying, by the DDoS attack detection and mitigation system, the SDN controller in the industrial backhaul network of information on a DDoS attack from the access network, the information comprising a source MAC address, a source network device ID, an operating channel, and a PAN_ID of the attack source;
- step S603-3: informing, by the SDN controller, the industrial access network system manager that cooperates with the SND controller of information on the attack data flow; reallocating, by the industrial access network system manager, network sources and formulating a corresponding attack mitigation strategy to block continued communications of a DDoS attack source device within the industrial access network; and
- step S603-4: determining that the DDoS attack is over when the SDN controller reads that ΔM and ΔN of the OF switch are both within a normal threshold; deleting the "dedicated flow entry for attack mitigation"; obtaining, by the controller, topology information; proactively sending flow table modification information to the OF switch to update the flow table, and operating in a mode of passively issuing the flow table.

The beneficial effects of the present disclosure are:

(1) The present disclosure defines, based on an SDN industrial access network joint scheduling architecture, a dedicated flow entry for mitigating DDoS attacks to defend against attack data flows in a timely manner, introduces a DDoS attack detection and mitigation system, and formulates a corresponding detection and mitigation method for DDoS attacks in a case of combination of two flow table issuance modes.

(2) The present disclosure fully considers the characteristics of the industrial access network data packet when detecting the DDoS attack, extends the matching field of the flow entry defined by the OpenFlow to be better compatible with the industrial access network that does not support the IP, and performs flow table matching accordingly. The real-time performance of industrial network data is ensured with highest priority when mitigating DDoS attacks, ensuring high reliability and low latency of data transmission in industrial access networks.

(3) The present disclosure combines the machine learning method and the statistical comparison method to identify the abnormal traffic of the DDoS attack, which is more accurate and faster than the traditional DDoS detection method.

BRIEF DESCRIPTION OF THE DRAWINGS

In order to make the objects, technical solutions and advantageous effects of the present disclosure more clear, the present disclosure is explained with reference to the following drawings.

DETAILED DESCRIPTION

Preferred embodiments of the present disclosure will be described in detail below with reference to the accompanying drawings.

Figure 1:
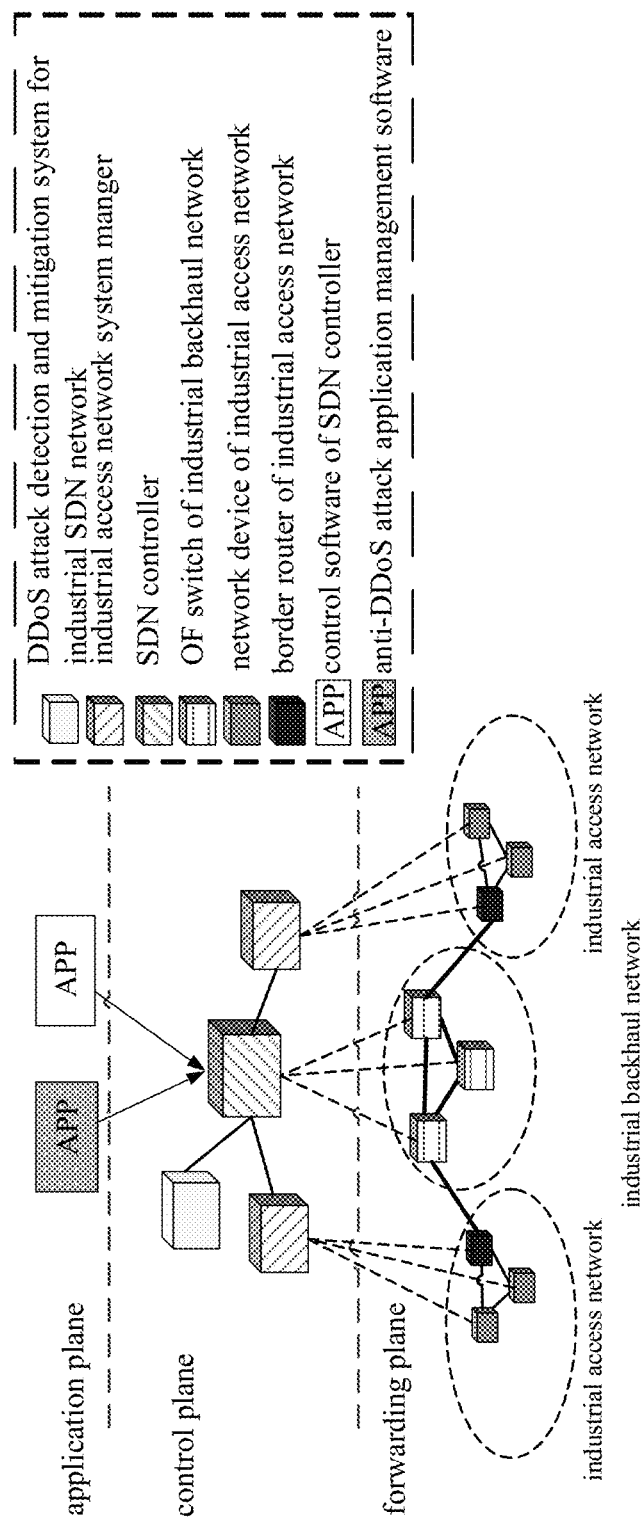
FIG. 1 is a DDoS detection system architecture for industrial network based on SDN joint scheduling architecture.

For a typical SDN-based industrial backhaul network architecture, the present disclosure provides a DDoS detection and mitigation architecture for industrial network based on SDN joint scheduling architecture, including an application plane, a control plane, and a forwarding plane as shown in FIG. 1.

The application plane includes control software of an SDN controller and anti-DDOS attack application management software.

The control software of the SDN controller: users configure the SND controller by the control software of the SDN controller.

The anti-DDoS attack application management software: supporting security personnel to formulate a corresponding defense strategy according to characteristic of a network DDoS attack to ensure that the network runs securely.

The control plane includes the SDN controller, an industrial access network system manger, and a DDoS attack detection and mitigation system for an industrial SDN network.

The SDN controller is responsible for controlling and scheduling of resources of the industrial backhaul network, network link discovery topology management, status monitoring, strategy formulating and issuance of flow tables of, and provides monitored information for query of the DDoS attack detection and mitigation system, wherein a joint scheduler that runs on the SDN controller is responsible for industrial access network system manager interaction and computation and decision-making of a data transmission path and resource information of the industrial access network.

The industrial access network system manger is responsible for configuring a network attribute of the industrial access network, managing a routing table, communications between scheduling devices, monitoring network performance and security management; and responsible for managing operation of devices in the network and communications of an entire wireless network, including device access and off-grid, monitoring and reporting of network failures, and communications configuration management.

The DDoS attack detection and mitigation system for an industrial SDN network includes a detection module and a mitigation module.

The detection module is configured to analyze real-time data sent by the industrial network to the OpenFlow switch based on status monitoring information of the SDN controller, extract a corresponding data characteristic, determine whether a DDoS attack is received and report a determination result to the DDoS attack mitigation system.

The mitigation module is responsible for responding quickly to DDoS attacks in the network and scheduling traffic in the industrial network through the SDN controller.

The forwarding plane includes the OF switch in the industrial backhaul network and a network device of the industrial access network.

The OF switch is located in the industrial backhaul network and relies on a global view function of the SDN controller to implement flexible and efficient configuration of the industrial backhaul network.

The network device of the industrial access network is a network transmission physical entity of the industrial access network, and provides management and configuration of the industrial access network system manager to achieve network functions required by the industrial access network system manager.

An border router of the industrial access network is one of the network device of the industrial access network, and is responsible for processing a message and forwarding the processed message to the industrial backhaul network.

Based on the above architecture, the present disclosure provides a DDoS attack detection and mitigation method for an industrial backhaul network and an industrial access network based on SDN joint scheduling architecture.

Figure 2:
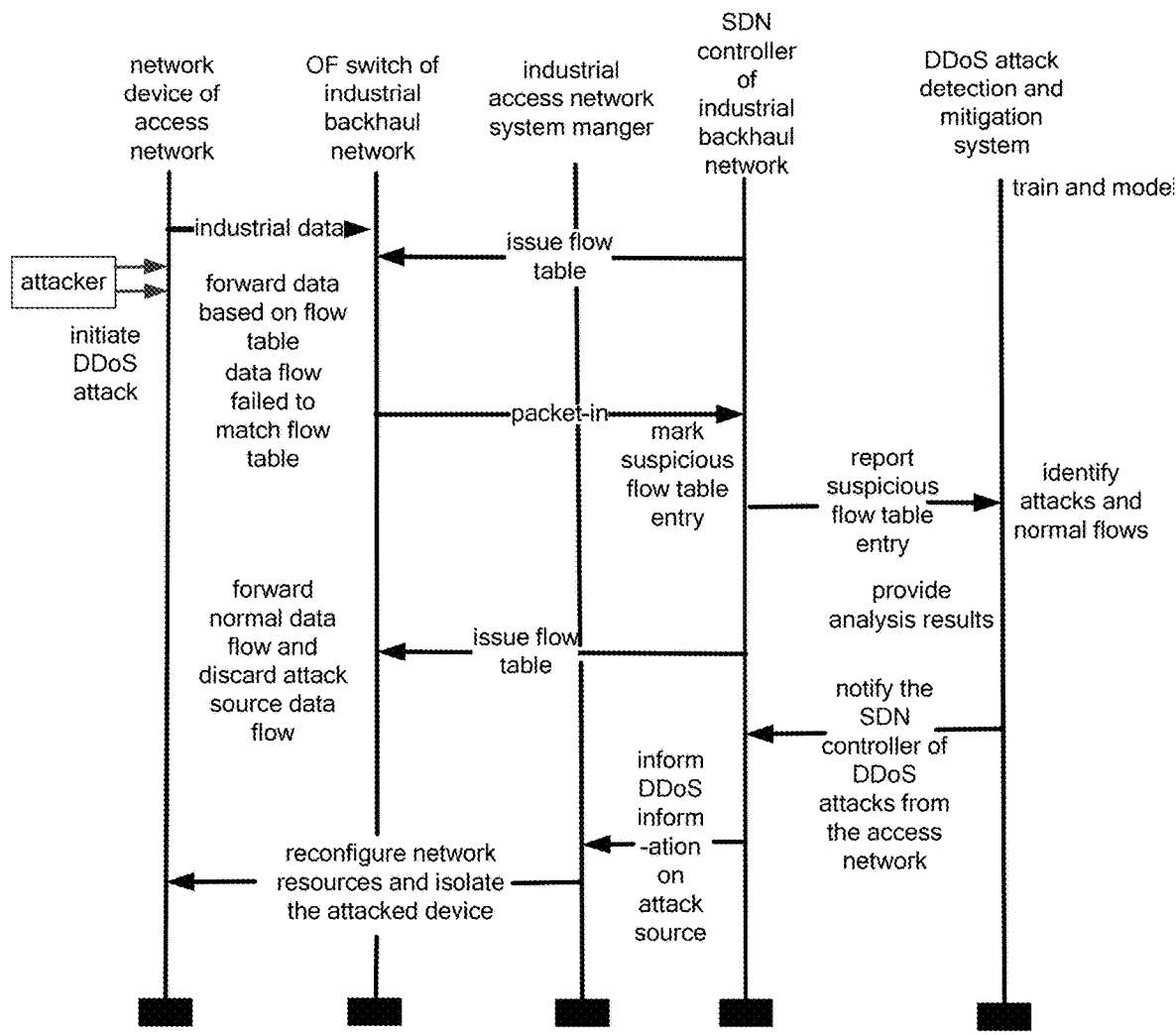
FIG. 2 is a flow chart of a mechanism for detecting and mitigating DDoS attacks in an industrial SDN network.

A flow chart of the DDoS attack detection and mitigation process for an industrial SDN network is shown in FIG. 2. The attack detection and mitigation mechanism according to the present disclosure includes the following steps 1 to 6.

In step 1, the network operates normally, and the industrial access network forwards data messages to the industrial backhaul network.

The industrial access network has various forms and protocols, including wired access networks (Modbus, FF, etc.) and wireless access networks (WIA-PA, ISA100.11a, etc.). When a border router forwards data to a backhaul network, not all of the original characteristics of the data are retained generally. For example, when data collected by a wireless access network node reaches the border, only an ID of the node and the collected data value are retained and forwarded by the border router generally.

This provides a condition for an attacker to initiate a DDoS attack using a node of the industrial access network. Because flow table matching cannot be performed on the industrial node ID by the OpenFlow protocol, only the border router can be located. Therefore, it is difficult to exactly locate the node under the DDoS attack.

In view of this, in order to implement the detection of the DDoS attack on the access network in the method of the present disclosure, the data message forwarded by the industrial access network to the industrial backhaul network is required to be improved as follows.

When an access network routing device sends a data packet to the border route, a gateway supports the conversion of industrial wired and industrial wireless protocols to IPv4 or IPv6 protocol, with the following characteristics of the original data retained: an access network type, a network protocol, a PAN_ID, an operating channel, a source MAC address, a destination MAC address, and a source device ID. For example, the WIA-PA protocol is converted to the IPv6 protocol, and the information in an original data packet, which indicates that the data comes from a wireless access network and that the protocol is WIA-PA, PAN_ID, operating channel, source MAC address, destination MAC address and source device ID, is retained in the data payload of the converted IPv6 protocol for flow table matching of the OF switch in the industrial backhaul network during cross-domain transmission.

In step 2, an OpenFlow flow entry is improved and extended.

Figure 3:
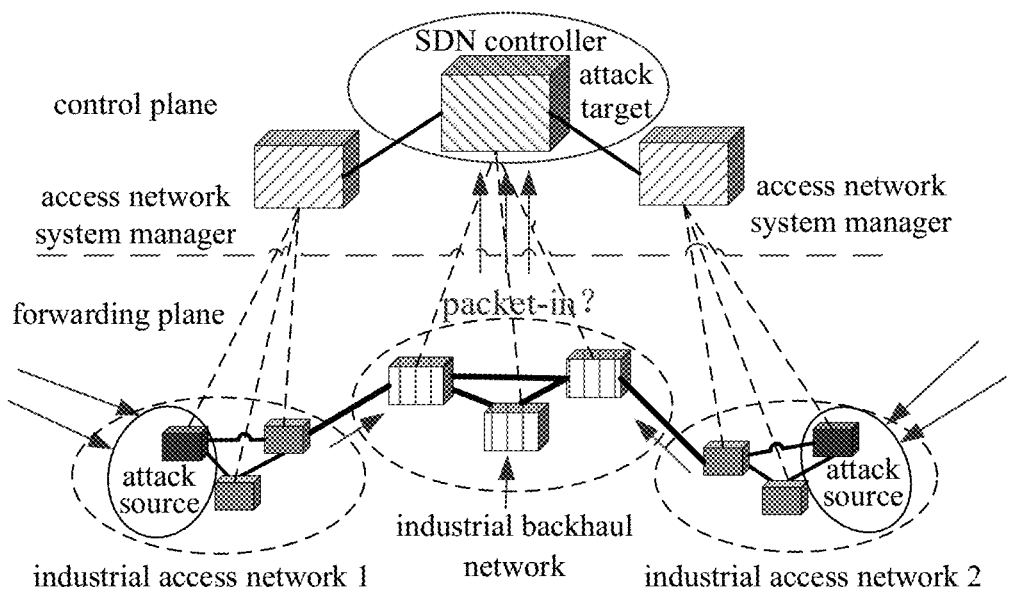
FIG. 3 shows the process of a DDoS attack in an industrial backhaul network joint scheduling architecture based on SDN.

As shown in FIG. 3, the routing device in the industrial access network (such as a WIA-PA network, an ISA100.11a network) is used as a puppet device by an attacker, which sends a large number of fake data packets to the access network. When some attack data packets are transmitted across domains through the industrial backhaul network, the SDN controller fails to operate properly due to the matching failure.

Figure 4:
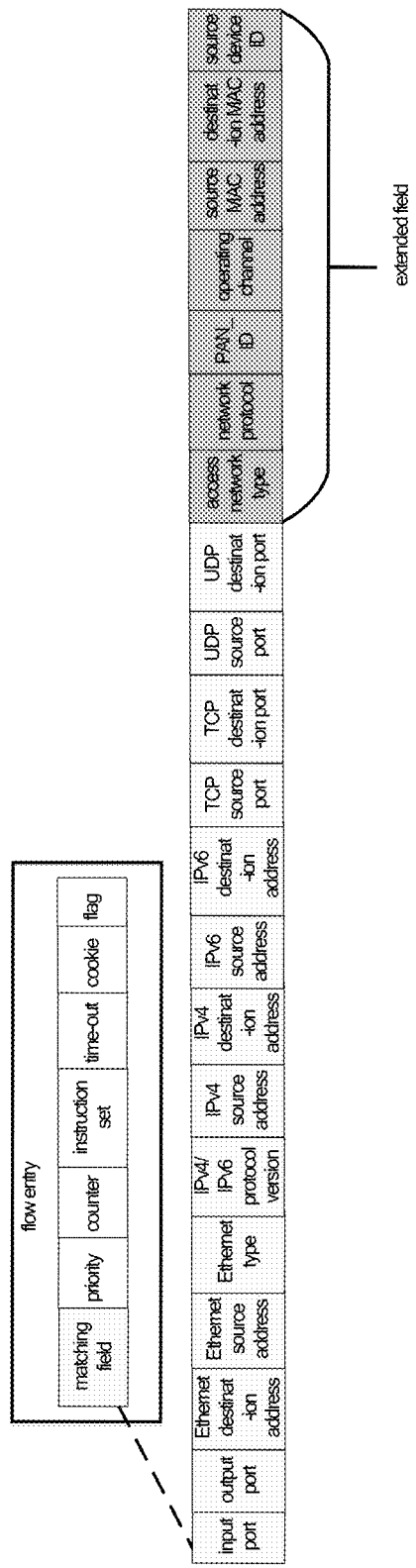
FIG. 4 shows a structure of an extended OpenFlow flow entry.

In order to ensure that the industrial wireless network protocol (such as WIA-PA) that does not support IP can be better compatible with the OF switch, the present disclosure modifies the traditional OpenFlow flow table by mainly extending a matching field of the flow entry of the Open-Flow switch by adding an extended field, to enable the OpenFlow switch to more accurately match data packets from the industrial access network. FIG. 4 shows a structure of the extended OpenFlow flow entry, and the extended field includes:

an access network type, used to mark whether the industrial access network is a wired network or a wireless network;

a network protocol, used to mark a network protocol of the industrial access network, such as WIA-PA, ISA100.11a and WirelessHART;

a PAN_ID, ID used to mark a personal area network (PAN);

an operating channel, used to mark a channel involved in a data transmission when data comes from a wireless access network;

a wireless network source MAC address, marking a source MAC address of data;

a wireless network destination MAC address, marking a destination MAC address of data; and a source Device ID, ID used to mark a data source.

After the OF switch is network-connected, the controller obtains a link status and proactively issues the extended flow table as shown in FIG. 4 to the switch.

In step 3, when the data is transmitted through the OF switch, the OF switch operates in the following mechanism.

When the data is transmitted through the OF switch, flow table matching is performed. There are two results of the flow table matching, matching and not matching.

In a case of matching: a data flow is matched and forwarded according to the matching field in the flow table, and a counter in the flow entry counts once for each matching of the flow entry.

In a case of not matching: a data flow table does not match the data flow, the switch first caches the data flow in a buffer, then extracts its header and packages the header into a packet-in message. If the buffer is full, the entire data packet is directly packaged into a packet-in message, the packet-in message is sent to the SDN controller for analysis and decision-making of the SDN controller, and then processed by issuing a flow-mod or packet-out message.

In step 4, the SDN controller queries the matching status of the OF switch, marks a suspicious flow entry and reports the packet-in message.

The SDN controller queries the number M of data flows matched by each flow entry per unit time, sets the number M* of normal data flows matched by each flow entry per unit time according to an empirical value, and calculates M−M*=ΔM.

The SDN controller queries the number N of packet-in messages per unit time and the sum of the number N* of flow-mod messages and packet-out messages per unit time, and calculates N−N*=ΔN.

If ΔM of a flow entry exceeds a threshold, the flow entry is marked as the suspicious flow entry by the SDN controller.

If ΔN currently sent by the OF switch to the SDN controller exceeds a threshold, the SDN controller determines that there is an abnormal data flow.

The ΔM and ΔN, which represent flow table mismatch tolerances of the OF switch of the industrial backhaul network, are set by a user through the anti-DDoS attack application management software.

The SDN controller reports the suspicious flow entry to the DDoS attack detection and mitigation system.

The SDN controller reports the packet-in message carrying the access network type, the network protocol, the PAN_ID, the operating channel, the source MAC address, the destination MAC address, and the source device ID to the DDoS attack detection and mitigation system. The DDoS attack detection and mitigation system determines whether the packet-in message is caused by normal traffic, normal burst traffic, DDoS attack traffic or L-DDoS attack traffic. The processing of the suspicious flow entry and the processing of the packet-in message by the DDoS attack detection and mitigation system are described in the two following steps 5 and 6, respectively.

In step 5, the DDoS attack detection and mitigation system processes the suspicious flow entry.

The DDoS attack detection and mitigation system notifies the industrial access network system manager of information on the suspicious flow entry, and the industrial access network system manager will reallocate the network resources and formulate corresponding mitigation attack strategies to block the continued communications of the DDoS attack source device within the industrial access network.

In step 6, the DDoS attack detection and mitigation system identifies and processes the packet-in passage.

a) Data Sample Training and Modeling Process

The DDoS attack detection and mitigation system requires training and modeling of normal data for industrial access networks and industrial backhaul networks. After the introduction of the characteristics of the industrial network, the training and modeling process for the data samples containing normal traffic, normal burst traffic, DDoS attack traffic, and L-DDoS attack traffic in the network includes the following steps 1 to 3.

Step 1 includes selecting the attribute "ΔM and ΔN" as a root node according to a C4.5 decision tree algorithm.

Step 2 includes blurring and discretizing, according to a traffic characteristic performance value table of the industrial access network, traffic characteristics into three characteristic degree values X, Y and Z.

TABLE 1

Traffic characteristic performance value table of industrial access network

| Traffic characteristics | Characteristic performance | | |
|---|---|---|---|
|  | X | Y | Z |
| IPv6/IPv4 source address | known and common | weak random variation | strong random variation |
| TCP source port | known and common | weak random variation | strong random variation |
| UDP source port | known and common | weak random variation | strong random variation |
| network protocol | access network protocol (such as WIA-PA, ISA100.11a, etc.) | unknown protocol | — |
| source device ID | known and common | weak random variation | strong random variation |
| source MAC address | known and common | weak random variation | strong random variation |
| operating channel | high channel quality | medium channel quality | low channel quality |
| ΔM and ΔN | ΔM and ΔN are both within the threshold | one of ΔM and ΔN is within the threshold | neither of ΔM and ΔN is within the threshold |

X, Y, and Z are counted by making statistics of the data flow samples as shown in Table 2, Table 3, and Table 4.

TABLE 2

Data sample value table when the root node is X

| No. | 1 IPv6/IPv4 source address | 2 TCP source port | 3 UDP source port | 4 network protocol | 5 source device ID | 6 source MAC address | 7 operating channel | 8 ΔM and ΔN | traffic type |
|---|---|---|---|---|---|---|---|---|---|
| sample 1 |  |  |  |  |  |  |  |  | X |
| sample 2 |  |  |  |  |  |  |  |  | X |
| ... |  |  |  |  |  |  |  |  | X |
| sample m |  |  |  |  |  |  |  |  | X |

TABLE 3

Data sample value table when the root node is Y

| No. | 1 IPv6/IPv4 source address | 2 TCP source port | 3 UDP source port | 4 network protocol | 5 source device ID | 6 source MAC address | 7 operating channel | 8 ΔM and ΔN | traffic type |
|---|---|---|---|---|---|---|---|---|---|
| sample 1 | | | | | | | | Y | |
| sample 2 | | | | | | | | Y | |
| ... | | | | | | | | Y | |
| sample n | | | | | | | | Y | |

TABLE 4

Data sample value table when the root node is Z

| No. | 1 IPv6/IPv4 source address | 2 TCP source port | 3 UDP source port | 4 network protocol | 5 source device ID | 6 source MAC address | 7 operating channel | 8 ΔM and ΔN | traffic type |
|---|---|---|---|---|---|---|---|---|---|
| sample 1 | | | | | | | | Z | |
| sample 2 | | | | | | | | Z | |
| ... | | | | | | | | Z | |
| sample x | | | | | | | | Z | |

Step 3 includes generating a decision tree by the following steps 1) to 3).

Step 1) includes selecting an attribute in an X direction of the root node, by:

a) vertically counting, according to table 2, Z in data flow characteristic values, and determining an attribute corresponding to a maximum number of Z as a child node of the root node in the X direction;

b) in a case that there is no Z, counting Y in the data flow characteristic values, comparing the numbers of Y with each other, and determining an attribute corresponding to a maximum number of Y as the child node of the root node in the X direction;

c) in a case that there is no Y, counting X in the data flow characteristic values, comparing the numbers of X with each other, and determining an attribute corresponding to a maximum number of X as the child node of the root node in the X direction; and d) in a case that two or more attributes corresponding to a same number of Z, Y or X, selecting, randomly, one attribute in the two or more attributes as the child node of the root node in the X direction.

Step 2) includes selecting an attribute in a Y direction of the root node, by:

a) vertically counting, according to table 3, Z in data flow characteristic values, and determining an attribute corresponding to a maximum number of Z as a child node of the root node in the Y direction;

b) in a case that there is no Z, counting Y in the data flow characteristic values, comparing the numbers of Y with each other, and determining an attribute corresponding to a maximum number of Y as the child node of the root node in the Y direction;

c) in a case that there is no Y, counting X in the data flow characteristic values, comparing the numbers of X with each other, and determining an attribute corresponding to a maximum number of X as the child node of the root node in the Y direction; and d) in a case that two or more attributes corresponding to a same number of Z, Y or X, selecting, randomly, one attribute in the two or more attributes as the child node of the root node in the Y direction.

Step 3) includes selecting an attribute in the Z direction of the root node, by:

a) vertically counting, according to table 4, Z in data flow characteristic values, and determining an attribute corresponding to a maximum number of Z as a child node of the root node in the Z direction;

b) in a case that there is no Z, counting Y in the data flow characteristic values, comparing the numbers of Y with each other, and determining an attribute corresponding to a maximum number of Y as the child node of the root node in the Z direction;

c) in a case that there is no Y, counting X in the data flow characteristic values, comparing the numbers of X with each other, and determining an attribute corresponding to a maximum number of X as the child node of the root node in the Z direction; and d) in a case that two or more attributes corresponding to a same number of Z, Y or X, selecting, randomly, one attribute in the two or more attributes as the child node of the root node in the Z direction.

Figure 5:
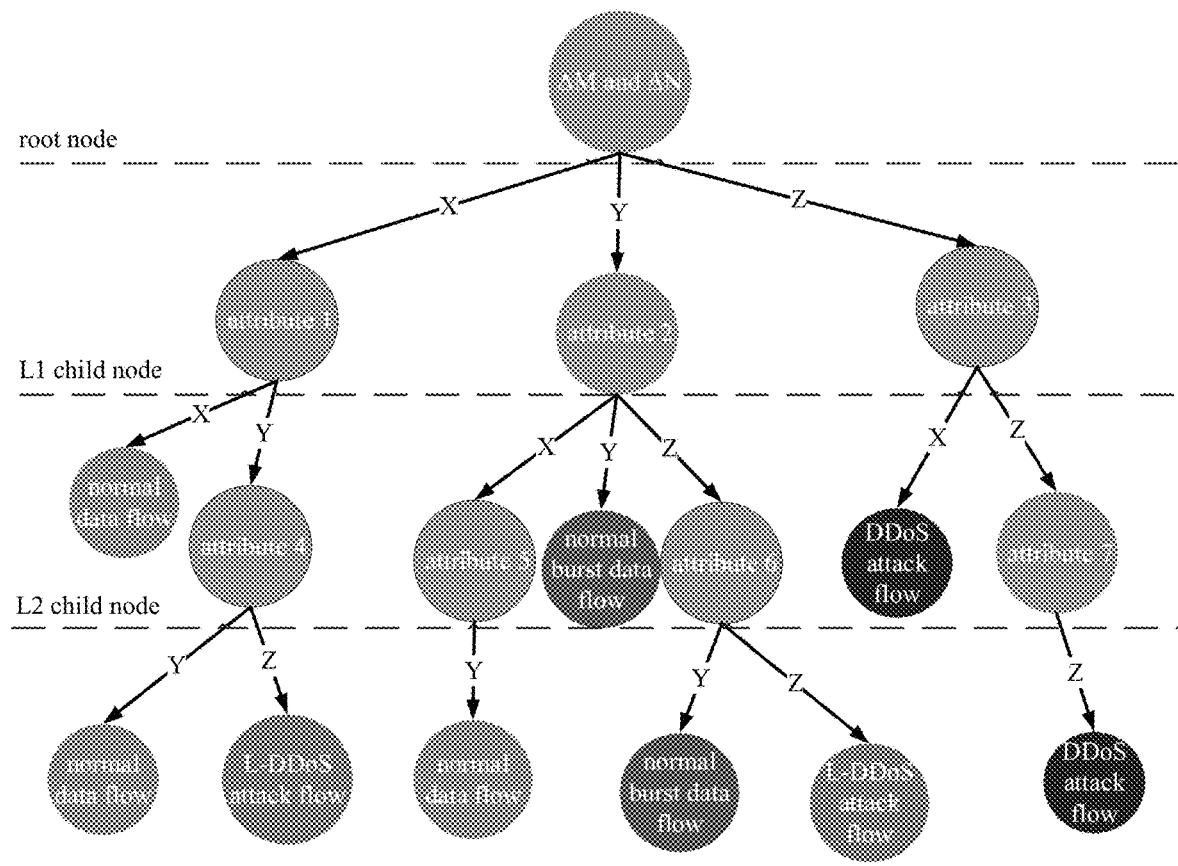
FIG. 5 shows a model of a data classification decision tree.

At this point, the attributes of the X, Y, and Z branches under the root node are classified to form second layer nodes. Third layer nodes are generated in a similar manner to the second layer nodes by generating and selecting attributes of the second-layer nodes in the X, Y and Z direction. By analogy, the decision tree model of four data classification subsets (normal traffic, normal burst traffic, DDoS attack traffic, and L-DDoS attack traffic) is generated, as shown in FIG. 5.

b) Attack Identification Process of the DDoS Attack Detection and Mitigation System The packet-in message is placed in the training sample model in step a) to determine which classification the packet-in message belongs to.

c) Processing Process of the DDoS Attack Detection and Mitigation System Processing Process, Including Steps 1 to 4

In step 1, the DDoS attack detection and mitigation system identifies a normal data flow and normal burst traffic cached in the OF switch in steps a) and b), and the SDN controller issues the extended flow table and forwards the data flow cached in the OF switch; and a normal data flow that is not cached in the OF switch is forwarded directly through an output port of the OF switch. The DDoS attack detection and mitigation system records relevant characteristics of an identified DDoS attack data flow and an identified L-DDoS attack data flow, writes the relevant characteristics of the identified DDoS attack data flow and the identified L-DDoS attack data flow into a "dedicated flow entry for attack mitigation" which is set to the highest priority, and issues the dedicated flow entry for attack mitigation to a flow table 0 of the OF switch, to block in a timely manner data packets data that an attack source continues to send.

In step 2, the DDoS attack detection and mitigation system notifies the industrial backhaul network SDN controller of information on an DDoS attack from the access network, including a source MAC address, a source network device ID, an operating channel, and a PAN_ID of the attack source.

In step 3, the SDN controller informs the industrial access network system manager that cooperates with the SDN controller of information of the attack data flow, and the industrial access network system manager reallocates network sources and formulates corresponding mitigation attack strategies to block continued communication of DDoS attack source devices within the industrial access network.

In step 4, the SDN controller determines that the DDoS attack is over on reading that ΔM and ΔN of the OF switch are within a normal threshold, deletes the "dedicated flow entry for attack mitigation", obtains topology information, proactively sends flow table modification information to the OF switch to update the flow table, and then operates in a mode of passively issuing the flow table.

In a case of burst of DDoS attacks after an industrial wireless network of WIA-PA network accesses the backhaul network, the method includes the following steps.

In step 1, the network operates normally, and the WIA-PA network forwards data messages to the industrial backhaul network.

When the WIA-PA network data is sent to an border router, the WIA-PA protocol is converted to the IPv4 or IPv6 protocol, and the information on the original data packet, which indicates that the data comes from a wireless access network and that the protocol is WIA-PA, PAN_ID, operating channel, source MAC address, destination MAC address and source device ID, is retained in the data payload of the converted IPv4 or IPv6 protocol for flow table matching of the OF switch in the industrial backhaul network during cross-domain transmission.

In step 2, an OpenFlow flow entry is improved and extended.

A routing device in the WIA-PA network is used as a puppet device by the attacker, and the attacker sends fake data packets to the device, as a consequence of which attack data flows transmitted across domains do not match the flow table in the OF switch of the industrial backhaul network. This reduces the forwarding efficiency of the OF switch, and further causes shutdown of the SDN controller due to the OF switch querying a large number of packet-in messages sent by the SDN controller.

To ensure that the WIA-PA protocol that does not support IP can be better compatible with the OpenFlow switch, the present disclosure modifies the traditional OpenFlow flow table in the following manner.

For the extended flow entry structure of the WIA-PA protocol, the extended field includes: an access network type which is marked as industrial wireless network and the network protocol which is marked as WIA-PA network protocol. The rest of the extended field is configured according to practical situations.

In step 3, when the data is transmitted through the OF switch, the OF switch operates in the following mechanism.

When WIA-PA network data is transmitted through the OF switch, flow table matching is performed. There are two results of the flow table matching, matching and not matching.

In a case of matching: a WIA-PA network data flow is matched and forwarded according to the matching field in the flow table, and a counter in the flow entry counts once for each matching of the flow entry.

In a case of not matching: an OF switch data flow table does not match the WIA-PA network data flow, the switch first caches the WIA-PA network data flow table in a buffer, then extracts its header and packages the header into a packet-in message. If the buffer is full, the entire data packet is directly packaged into a packet-in message, the packet-in message is sent to the SDN controller for analysis and decision making of the SDN controller, and then processed by issuing a flow-mod or packet-out message.

In step 4, the SDN controller queries the matching status of the OF switch, marks a suspicious flow entry and reports the packet-in message.

The SDN controller queries the number M of data flows matched by each flow entry per unit time, sets the number $M^*$ of normal data flows matched by each flow entry per unit time according to an empirical value, and calculates $M-M^*=\Delta M$.

The SDN controller queries the number N of packet-in messages per unit time and the sum of the number $N^*$ of flow-mod messages and packet-out messages per unit time, and calculates $N-N^*=\Delta N$.

If ΔM of a flow entry exceeds a threshold, the flow entry is marked as the suspicious flow entry by the SDN controller.

If ΔN currently sent by the OF switch to the SDN controller exceeds a threshold, the SDN controller determines that there is an abnormal data flow.

The ΔM and ΔN, which represent flow table mismatch tolerances of in the OF switch of the industrial backhaul network, is set by a user through the anti-DDoS attack application management software.

The SDN controller reports the suspicious flow entry to the DDoS attack detection and mitigation system.

The SDN controller reports the packet-in message carrying the access network type, the network protocol, the PAN_ID, the operating channel, the source MAC address, the destination MAC address, and the source device ID to the DDoS attack detection and mitigation system. The DDoS attack detection and mitigation system determines whether the packet-in message is caused by normal traffic, normal burst traffic, DDoS attack traffic or L-DDoS attack traffic.

The processing of the suspicious flow entry and the processing of the packet-in message by the DDoS attack detection and mitigation system are described in the two following steps 1 and 2, respectively.

In step 1, the DDoS attack detection and mitigation system processes the suspicious flow entry.

The DDoS attack detection and mitigation system notifies a WIA-PA network system manager of information on the suspicious flow entry, and the WIA-PA network system manager reallocates network resources and formulates corresponding mitigation attack strategies to block the continued communications of a DDoS attack source device within the WIA-PA network.

In step 2, the DDoS attack detection and mitigation system identifies the packet-in passage.

a) Data Sample Training and Modeling Process

The DDoS attack detection and mitigation system requires training and modeling of normal data for the WIA-PA network and the industrial backhaul network. After the introduction of the characteristics of the industrial network, the training and modeling process for the data samples containing normal traffic, normal burst traffic, DDoS attack traffic, and L-DDoS attack traffic in the network includes the following steps 1 to 3.

Step 1 includes selecting the attribute "ΔM&ΔN" as a root node according to a C4.5 decision tree algorithm.

Step 2 includes blurring and discretizing, according to a traffic characteristic performance value table of the industrial access network, traffic characteristics into three characteristic degree values (X, Y, Z).

TABLE 5

Traffic characteristic performance value table of industrial access network

| Traffic characteristics | Characteristic performance | | |
|---|---|---|---|
| | X | Y | Z |
| IPv6/IPv4 source address | known and common | weak random variation | strong random variation |
| TCP source port | known and common | weak random variation | strong random variation |
| UDP source port | known and common | weak random variation | strong random variation |
| network protocol | WIA-PA | — | unknown protocol |
| source device ID | known and common | weak random variation | strong random variation |
| source MAC address | known and common | weak random variation | strong random variation |
| operating channel | high channel quality | medium channel quality | low channel quality |
| ΔM and ΔN | ΔM and ΔN are both within the threshold | one of ΔM and ΔN is within the threshold | neither of ΔM and ΔN is within the threshold |

Table 6 shows the specific data flow sample information, in which 20 samples are listed for exemplary explanation.

TABLE 6

20 data flow samples

| No. | 1 IPv6/IPv4 source address | 2 TCP source port | 3 UDP source port | 4 network protocol | 5 source device ID | 6 source MAC address | 7 operating channel | 8 ΔM and ΔN | traffic type of samples |
|---|---|---|---|---|---|---|---|---|---|
| 1 | Z | X | X | X | X | Y | X | Y | normal burst |
| 2 | Y | Y | Z | — | X | X | X | Z | normal burst |
| 3 | Y | X | Y | Z | X | Z | Y | Y | normal burst |
| 4 | X | X | Y | X | Y | Y | Z | Z | normal burst |
| 5 | X | Y | Z | — | Y | X | Y | Y | normal burst |
| 6 | Z | X | Z | X | X | Z | X | Z | DDoS attack |
| 7 | X | X | Z | X | Y | Z | Z | Z | DDoS attack |
| 8 | Z | Y | X | X | Y | Z | Z | Z | DDoS attack |
| 9 | Z | X | Z | — | Y | Z | Z | Z | DDoS attack |
| 10 | Z | Y | Z | X | X | X | Z | Z | DDoS attack |
| 11 | X | X | X | Z | X | X | X | X | normal |
| 12 | Y | Y | Y | Z | Y | Y | Y | X | normal |
| 13 | X | X | X | X | Y | Y | Y | X | normal |
| 14 | Y | Y | Y | X | X | X | X | X | normal |
| 15 | X | X | Y | — | Y | X | X | X | normal |
| 16 | Z | X | X | — | Y | X | Z | X | L-DDoS attack |
| 17 | Y | X | Z | X | Y | Y | Z | X | L-DDoS attack |
| 18 | X | Y | X | Z | Z | Y | Z | Y | L-DDoS attack |
| 19 | X | Y | X | X | X | Z | Z | X | L-DDoS attack |
| 20 | Z | X | Y | X | Y | Z | Y | Y | L-DDoS attack |

Taking the above WIA-PA network traffic data set sample as an example, the C4.5 decision tree algorithm is used to select the root node attribute. The specific process includes the following:

1) calculating the information entropy of the 20 samples, where the samples S is divided into four categories (5 normal flows, 5 normal burst flows, 5 DDoS attack flows, and 5 L-DDoS attack flows):

$$\text{Entropy}(S) = \text{Entropy}\left(\frac{5}{20}, \frac{5}{20}, \frac{5}{20}, \frac{5}{20}\right) =$$
$$-\frac{5}{20}\log_2\frac{5}{20} - \frac{5}{20}\log_2\frac{5}{20} - \frac{5}{20}\log_2\frac{5}{20} - \frac{5}{20}\log_2\frac{5}{20} = 2$$

2) calculating the information entropy of S when divided according to different attributes, where A=the number of matching flow entries, the number S of Packet-in messages={$S_1, S_2, S_3$}={X(5+3),Y(3+2),Z(5+2)}:

$$\text{Entropy}_A(S) = \frac{8}{20}\text{Entropy}(S_1) + \frac{5}{20}\text{Entropy}(S_2) + \frac{7}{20}\text{Entropy}(S_2) =$$
$$\frac{8}{20}\left[-\frac{5}{8}\log_2\frac{5}{8} - \frac{3}{8}\log_2\frac{3}{8}\right] +$$
$$\frac{5}{20}\left[-\frac{3}{5}\log_2\frac{3}{5} - \frac{2}{5}\log_2\frac{2}{5}\right] + \frac{7}{20}\left[-\frac{5}{7}\log_2\frac{5}{7} - \frac{2}{7}\log_2\frac{2}{7}\right] = 0.9267$$

3) calculating the information gain by traffic type according to the following formula;

$$\text{Gain}(S,A) = \text{Entropy}(S) - \text{Entropy}_A(S) = 2 - 0.9267 = 1.0733$$

4) calculating split information:

$$\text{SplitE}(A) = -\frac{8}{20}\log_2\frac{8}{20} - \frac{5}{20}\log_2\frac{5}{20} - \frac{7}{20}\log_2\frac{7}{20} = 1.5589$$

5) calculating the information gain ratio:

$$\text{GainRatio}(A) = \frac{\text{Gain}(A)}{\text{SplitE}(A)} = \frac{1.0733}{1.5589} = 0.6885$$

Steps 2)-5) are repeated to calculate the information gain ratios by other attributes in a similar manner:

GainRatio(source IP address)=0.2404;

GainRatio(TCP source port)=0.0901;

GainRatio(UDP source port)=0.275;

GainRatio(industrial wireless network protocol)=0.1384;

GainRatio(industrial wireless source network device id)=0.1216;

GainRatio(industrial wireless source MAC address) =0.2511;

GainRatio(industrial channel quality)=0.3608.

By comparison, the gain ratio of "ΔM &ΔN" is the largest, and ΔM and ΔN are taken as the root node. The decision tree algorithm contains a large number of logarithmic operations, and the time overhead is large in a case of plenty of sample data. Therefore, in selecting a leaf node, the information gain ratios are no longer calculated, and a child node is quickly obtained simply by vertically comparing statistics of individual data flow characteristics in the whole sample.

There are three branches (X, Y, Z) under the root node. The following description of the steps is made taking calculation for X branch nodes of the root node for example.

1) The complete 20 data flow samples are branched according to the value of the root node (X, Y, Z) into three subsamples(X=8, Y=5, Z=7), where subsample 1 (X=8) as shown in Table 7 below.

TABLE 7

| | | | | | | | | | |
|---|---|---|---|---|---|---|---|---|---|
| | Subsample data set | | | | | | | | |
| No. | 1 IPv6/IPv4 source address | 2 TCP source port | 3 UDP source port | 4 network protocol | 5 source device ID | 6 source MAC address | 7 operating channel | 8 ΔM and ΔN | traffic type of samples |
| 11 | X | X | X | Z | X | X | X | X | normal |
| 12 | Y | Y | Y | Z | Y | Y | Y | X | normal |
| 13 | X | X | X | X | Y | Y | Y | X | normal |
| 14 | Y | Y | Y | X | X | X | X | X | normal |
| 15 | X | X | Y | — | Y | X | X | X | normal |
| 16 | Z | X | X | — | Y | X | Z | X | L-DDoS attack |
| 17 | Y | X | Z | X | Y | Y | Z | X | L-DDoS attack |
| 19 | X | Y | X | X | X | Z | Y | X | L-DDoS attack |

2) The numbers {Z1, Z2, Z3, Z4, Z5, Z6, Z7} of Z in the data flow characteristic values with serial numbers 1-7 of 8 samples are obtained by vertically counting Z, {Z1, Z2, Z3, Z4, Z5, Z6, Z7}={1,0,1,2,0,1,2}, where Z4 and Z7 are both 2, and then the seventh data flow characteristic attribute "operating channel" is randomly selected as a decision child node in the branch.

3) Three subsamples (X=3, Y=3, Z=2) are split from the "operating channel" child node, according to the branch conditions (X, Y, Z). In this case, the subsample 1 (X=3) and subsample 3 (Z=2) appear only in one category. In other words, the data flow category is obtained, and therefore there is no further branching.

4) Conversely, since subsample 2 (Y=3) in step 3) appears in both data flow categories, the branching continues. The numbers {Z1, Z2, Z3, Z4, Z5, Z6} of Z in the remaining 1-6 data flow characteristic values of sample data numbers 12, 13, and 19 are obtained by vertically counting Z, {Z1, Z2, Z3, Z4, Z5, Z6}={0,0,0,1,0,1}, and the sixth data flow characteristic attribute "source MAC address" is randomly select as a decision child node.

5) Three subsamples are branched from the child node of "source MAC address" according to the branch condition (Y=2, Z=1). Since both of the samples appear in only one category, the branching is no longer continued, and the data flow category is obtained.

6) At this point, the traffic classification of the X branch of the root node is completed.

The branch nodes of Y and Z of the root node are calculated in the same way as the above process, and the traffic classification processes of the X, Y, and Z branches are performed simultaneously. Finally, the traffic classification decision tree model shown in FIG. 6 is obtained.

Figure 6:
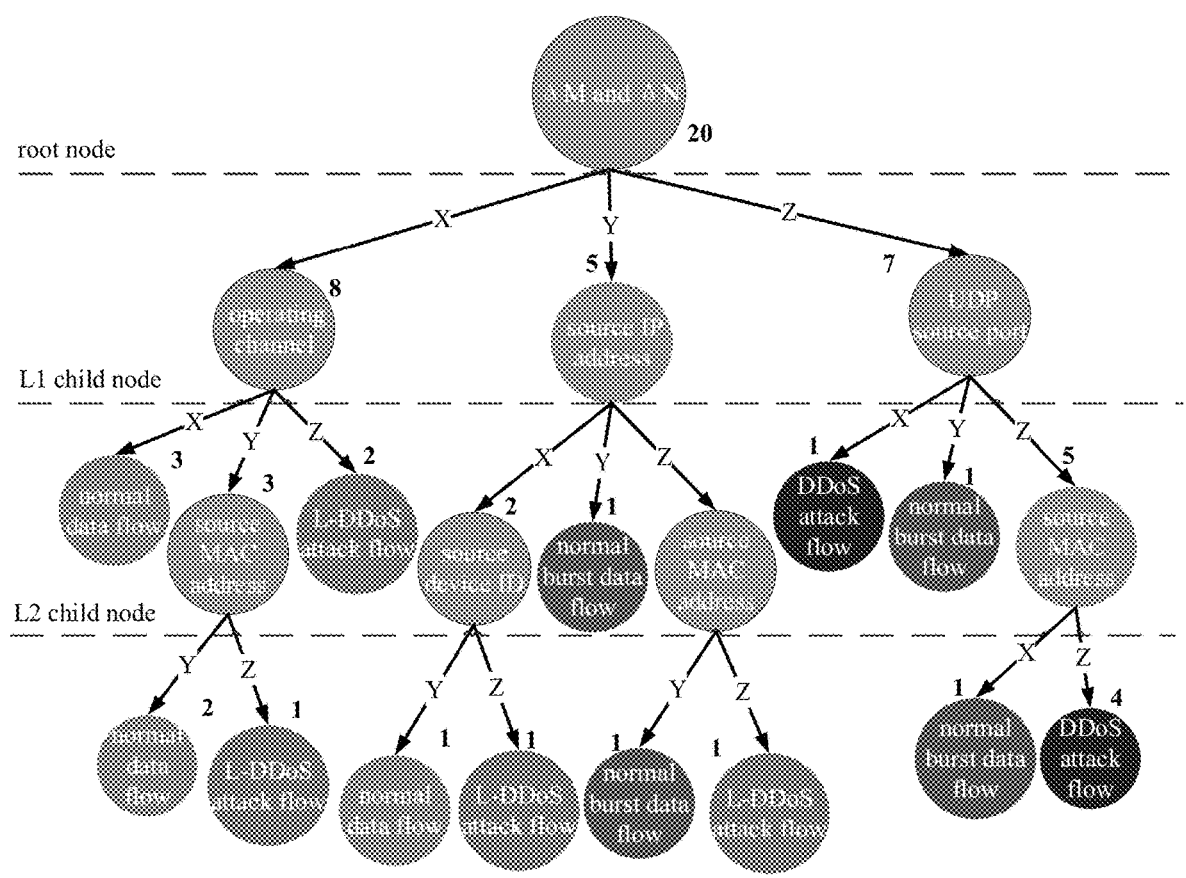
FIG. 6 shows an exemplary trained traffic classification decision tree model for WIA-PA network.

In the process of establishing the decision tree model in FIG. 6, the root node is branched according to the degree values X, Y, and Z of traffic characteristic attributes, and X, Y, and Z in the samples are separately counted. If the number of flows for a value is 0, the number of branches is reduced by one until the flow type is finally obtained. When selecting each layer of child nodes close to the root node, the node attributes can be repeated, but the attributes of the child nodes on each decision path down from the root node are not repeatable. The more sample data there are, the more layers there are, but the maximum number of layers is limited to 8 (identical with the number of selected traffic characteristic attributes).

Table 8 is the real-time packet-in data flow obtained by the SDN controller. By comparison and analysis with reference to the traffic classification decision tree model described above, a type of the packet-in data flow is obtained.

TABLE 8

| | Real-time packet-in data flow | | | | | | | | |
|---|---|---|---|---|---|---|---|---|---|
| No. | 1 IPv6/IPv4 source address | 2 TCP source port | 3 UDP source port | 4 network protocol | 5 source device ID | 6 source MAC address | 7 operating channel | 8 ΔM and ΔN | conclusions |
| 1 | X | X | Y | Z | X | X | Y | Y | normal flow |
| 2 | Z | X | Y | X | Z | Y | Z | X | normal burst flow |
| 3 | X | X | Y | X | Z | Y | Z | X | normal burst flow |
| 4 | Y | X | Y | Z | X | Y | X | Y | normal flow |
| 5 | X | Z | Y | X | Y | X | Y | Z | L- DDoS attack flow |
| 6 | Z | Z | Z | X | Y | Z | Y | Z | DDoS attack flow |
| 7 | X | Y | Z | X | Y | Z | X | Z | DDoS attack flow |

According to the conclusions shown in Table 8, the SDN controller processes the packet-in data in the following manner.

For the two normal data flows numbered 1 and 4 and the two normal burst data flows numbered 2 and 3 in Table 8, the SDN controller forwards a data flows cached in the OF switch by issuing a flow table, and forwards a data flow that is not cached in the OF switch directly through the output port.

For the three attack data flows numbered 5, 6, and 7 in Table 8, the SDN controller writes their characteristics into a "dedicated flow entry for attack mitigation" and issues the "dedicated flow entry for attack mitigation" to a flow table 0 of the OF switch, which is set to the highest priority to block in a timely manner data packets that an attack source continues to send.

It should be further noted that the preferred embodiments are intended for purpose of explaining rather than limiting the technical solutions of the present disclosure. Though the present disclosure is described in detail through the above preferred embodiments, those in the art shall appreciate that various formal and detail modifications may be made thereon without deviating from the scope defined by the claims of the present disclosure.

The invention claimed is:

1. A method for detecting and mitigating Distributed Denial of Service (DDoS) attacks in industrial software defined networks (SDN), comprising:
    step S1: establishing a DDoS detection and mitigation system architecture for industrial network based on SDN joint scheduling architecture;
    step S2: forwarding, by an industrial access network, a data message to an industrial backhaul network in normal network operation;
    step S3: extending flow entries of OpenFlow flow entry;
    step S4: performing flow table matching when data is transmitted through an OpenFlow (OF) switch;
    step S5: querying a matching status of the OF switch, marking a suspicious flow entry and reporting a packet-in message, by an SDN controller; and
    step S6: processing the suspicious flow entry, or identifying the packet-in message, by a DDoS attack detection and mitigation system; wherein
    the DDoS detection and mitigation system architecture for industrial network based on SDN joint scheduling architecture in the step S1 comprises an application plane, a control plane and a forwarding plane, wherein
        the application plane comprises control software of the SDN controller and anti-DDoS attack application management software, wherein
            the control software of the SDN controller is configured to configure the SDN controller for a user; and
            the anti-DDoS attack application management software is configured to support security personnel to formulate a corresponding defense strategy according to characteristic of a network DDoS attack to ensure secure network operation;
        the control plane comprises the SDN controller, an industrial access network system manger, and the DDoS attack detection and mitigation system for an industrial SDN network, wherein
            the SDN controller is responsible for controlling and scheduling of resources of the industrial backhaul network, network link discovery topology management, status monitoring, strategy formulating and issuance of flow tables of, and provides monitored information for query of the DDoS attack detection and mitigation system, wherein a joint scheduler that runs on the SDN controller is responsible for industrial access network system manager interaction and computation and decision-making of a data transmission path and resource information of the industrial access network;

the industrial access network system manger is responsible for configuring a network attribute of the industrial access network, managing a routing table, communications between scheduling devices, monitoring network performance and security management; and responsible for managing operation of devices in the industrial access network and communications of an entire wireless network, comprising device access and off-grid, monitoring and reporting of network failures, and communications configuration management; and the DDoS attack detection and mitigation system for an industrial SDN network comprises a detection module and a mitigation module, wherein the detection module is configured to analyze real-time data sent by an industrial network to the OpenFlow switch based on status monitoring information of the SDN controller, extract a corresponding data characteristic, determine whether a DDoS attack is received and report a determination result to a DDoS attack mitigation system, and the mitigation module is responsible for fast response to DDoS attacks in the industrial access network and scheduling traffic in the industrial network through the SDN controller;

the forwarding plane comprises the OF switch in the industrial backhaul network and a network device of the industrial access network, wherein the OF switch is located in the industrial backhaul network and relies on a global view function of the SDN controller to implement flexible and efficient configuration of the industrial backhaul network; and the network device of the industrial access network is a network transmission physical entity of the industrial access network, and provides management and configuration of the industrial access network system manager to achieve network functions required by the industrial access network system manager, wherein the network device of the industrial access network comprises an border router of the industrial access network, and the border router of the industrial access network is responsible for processing a message and forwarding the processed message to the industrial backhaul network.

2. The method for detecting and mitigating DDoS attacks in industrial SDN according to claim 1, wherein the step S2 comprises:

supporting, by a gateway, conversion of an industrial wired protocol and an industrial wireless protocol to IPv4 or IPv6 protocol when an access network routing device sends a data packet to a border router; and retaining following characteristics of original data: an access network type, a network protocol, a PAN_ID, an operating channel, a source MAC address, a destination MAC address, and a source device ID.

3. The method for detecting and mitigating DDoS attacks in industrial SDN according to claim 1, wherein the step S3 comprises:

extending a matching field of a flow entry of the OpenFlow switch by adding an extended field, to enable the OpenFlow switch to more accurately match data packets from the industrial access network; and obtaining, by the SDN controller, a link status after the OpenFlow switch is network-connected, and issuing an extended flow table to the OpenFlow switch proactively;

wherein the extended field comprises:

an access network type, used to mark whether the industrial access network is a wired network or a wireless network;

a network protocol, a network protocol for marking industrial access networks;

a PAN_ID, ID used to mark a personal area network;

an operating channel, used to mark a channel involved in a data transmission when data comes from a wireless access network;

a wireless network source MAC address, marking a source MAC address of data;

a wireless network destination MAC address, marking a destination MAC address of data; and a source Device ID, used to mark a data source.

4. The method for detecting and mitigating DDoS attacks in industrial SDN according to claim 1, wherein the step S4 comprises:

in a case that a data flow matches a matching field in a flow table:
counting, by a counter in the OpenFlow flow entry, once for matching one of the flow entries of OpenFlow flow entry;

in a case that the data flow does not match the matching field in the flow table:
caching, by the OF switch, the data flow in a buffer;
extracting a header of the data flow and packaging the header of the data flow into the packet-in message; and
packaging, in a case that the buffer is full, an entire data packet into the packet-in message;
sending the packet-in message to the SDN controller for analysis and decision-making of the SDN controller; and
processing by issuing a flow-mod or a packet-out message.

5. The method for detecting and mitigating DDoS attacks in industrial SDN according to claim 1, wherein the step S5 comprises:

step S501: querying, by the SDN controller, the number M of matching data flows of each of the flow entries per unit time, setting, by the SDN controller, the number M* of normal data flows matched by each of the flow entries per unit time according to an empirical value, and calculating M−M*=ΔM;

step S502: querying, by the SDN controller, the number N of packet-in messages per unit time and a sum of the number N* of flow-mod messages and packet-out messages per unit time, and calculating N−N*=ΔN;

step S503: marking, in a case that ΔM of a flow entry exceeds a threshold, the flow entry as the suspicious flow entry by the SDN controller;

step S504: determining, in a case that ΔN currently sent by the OF switch to the SDN controller exceeds a threshold, that there is an abnormal data flow, by the SDN controller;

step S505: setting, by a user through anti-DDoS attack application management software, flow table mismatch tolerances ΔM and ΔN of the OF switch of the industrial backhaul network;

step S506: reporting, by the SDN controller, the suspicious flow entry to the DDoS attack detection and mitigation system; and step S507: reporting, by the SDN controller, the packet-in message carrying an access network type, a network protocol, a PAN_ID, an operating channel, a source MAC address, a destination MAC address, and a source device ID to the DDoS attack detection and mitigation system, and determining, by the DDoS attack detection and mitigation system, whether the packet-in message is normal traffic, normal burst traffic, DDoS attack traffic or low-rate DDoS (L-DDoS) attack traffic.

6. The method for detecting and mitigating DDoS attacks in industrial SDN according to claim 1, wherein in the step S6, the processing the suspicious flow entry by the DDoS attack detection and mitigation system comprises:

notifying, by the DDoS attack detection and mitigation system, an industrial access network system manager of information on the suspicious flow entry; and reallocating, by the industrial access network system manager, network resources and formulating a corresponding attack mitigation strategy to block continued communications of a DDoS attack source device within the industrial access network.

7. The method for detecting and mitigating DDoS attacks in industrial SDN according to claim 1, wherein in the step S6, the identifying the packet-in message by the DDoS attack detection and mitigation system comprises:

step S601: data sample training and modeling:

training and modeling, by the DDoS attack detection and mitigation system, normal data of the industrial access network and the industrial backhaul network, and training and modeling data samples that comprises normal traffic, normal burst traffic, DDoS attack traffic and L-DDoS attack traffic after introducing characteristics of the industrial network, comprising:

step S601-1: selecting mismatch tolerances $\Delta M$ and $\Delta N$ as a root node according to a C4.5 decision tree algorithm;

step S601-2: blurring and discretizing, according to a traffic characteristic performance value table of the industrial access network, traffic characteristics into three characteristic degree values X, Y and Z; and making statistics of data flow samples and finding values of X, Y and Z; wherein when the traffic characteristic is an IPv6/IPv4 source address, X means known and common, Y means weak random variation, and Z means strong random variation;

when the traffic characteristic is a TCP source port, X means known and common, Y means weak random variation, and Z means strong random variation;

when the traffic characteristic is a UDP source port, X means known and common, Y means weak random variation, and Z means strong random variation;

when the traffic characteristic is a network protocol, X means an access network protocol, Y means null, and Z means an unknown protocol;

when the traffic characteristic is a source device ID, X means known and common, Y means weak random variation, and Z means strong random variation;

when the traffic characteristic is a source MAC address, X means known and common, Y means weak random variation, and Z means strong random variation;

when the traffic characteristic is an operating channel, X means the operating channel has a high channel quality, Y means the operating channel has a medium channel quality, and Z means the operating channel has a low channel quality;

when the traffic characteristic is $\Delta M$ and $\Delta N$, X means both $\Delta M$ and $\Delta N$ are within a threshold, Y means one of $\Delta M$ and $\Delta N$ is within the threshold, and Z means neither of $\Delta M$ and $\Delta N$ is within the threshold;

step S601-3: generating a decision tree:

1) selecting an attribute in an X direction of the root node, comprising:

1a) counting, vertically, Z in data flow characteristic values, and determining an attribute corresponding to a maximum number of Z as a child node of the root node in the X direction;

1b) in a case that there is no Z, counting Y in the data flow characteristic values, comparing the numbers of Y with each other, and determining an attribute corresponding to a maximum number of Y as the child node of the root node in the X direction;

1c) in a case that there is no Y, counting X in the data flow characteristic values, comparing the numbers of X with each other, and determining an attribute corresponding to a maximum number of X as the child node of the root node in the X direction; and 1d) in a case that two or more attributes corresponding to a same number of Z, Y or X, selecting, randomly, one attribute in the two or more attributes as the child node of the root node in the X direction;

2) selecting an attribute in a Y direction of the root node, comprising:

2a) counting, vertically, Z in data flow characteristic values, and determining an attribute corresponding to a maximum number of Z as a child node of the root node in the Y direction;

2b) in a case that there is no Z, counting Y in the data flow characteristic values, comparing the numbers of Y with each other, and determining an attribute corresponding to a maximum number of Y as the child node of the root node in the Y direction;

2c) in a case that there is no Y, counting X in the data flow characteristic values, comparing the numbers of X with each other, and determining an attribute corresponding to a maximum number of X as the child node of the root node in the Y direction; and 2d) in a case that two or more attributes corresponding to a same number of Z, Y or X, selecting, randomly, one attribute in the two or more attributes as the child node of the root node in the Y direction;

3) selecting an attribute in a Z direction of the root node, comprising:

3a) counting, vertically, Z in data flow characteristic values, and determining an attribute corresponding to a maximum number of Z as a child node of the root node in the Z direction;

3b) in a case that there is no Z, counting Y in the data flow characteristic values, comparing the numbers of Y with each other, and determining an attribute corresponding to a maximum number of Y as the child node of the root node in the Z direction;

3c) in a case that there is no Y, counting X in the data flow characteristic values, comparing the numbers of X with each other, and determining an attribute corresponding to a maximum number of X as the child node of the root node in the Z direction; and 3d) in a case that two or more attributes corresponding to a same number of Z, Y or X, selecting, randomly, one attribute in the two or more attributes as the child node of the root node in the Z direction;

wherein at this point, attribute classification of X, Y and Z branches of the root node is completed and second-layer nodes are formed;

generating third-layer nodes in a same way as the second-layer nodes by selecting attributes of the second-layer nodes in the X, Y and Z directions, respectively; and generating decision tree models for four data classification subsets comprising a normal traffic data classification subset, a normal burst traffic data classification subset, a DDoS attack traffic data classification subset and an L-DDoS attack traffic data classification subset, respectively;

step S602: identifying by the DDoS attack detection and mitigation system, comprising:

putting the packet-in message into a training sample model in step S701 for determination, and obtaining a classification of the packet-in message;

step S603: processing by the DDoS attack detection and mitigation system, comprising:

step S603-1: identifying, by the DDoS attack detection and mitigation system, a normal data flow and normal burst traffic cached in the OF switch in steps S701 and S702, forwarding, by the SDN controller, the data flow cached in the OF switch, and forwarding a normal data flow that is not cached in the OF switch directly through an output port of the OF switch; recording relevant characteristics of an identified DDoS attack data flow and an identified L-DDoS attack data flow, writing the relevant characteristics of the identified DDoS attack data flow and the identified L-DDoS attack data flow into a dedicated flow entry for attack mitigation which is set to the highest priority, and issuing the dedicated flow entry for attack mitigation to a flow table 0 of the OF switch to block, in a timely manner, data packets that an attack source continues to send;

step S603-2: notifying, by the DDoS attack detection and mitigation system, the SDN controller in the industrial backhaul network of information on a DDoS attack from the access network, the information comprising a source MAC address, a source network device ID, an operating channel, and a PAN_ID of the attack source;

step S603-3: informing, by the SDN controller, the industrial access network system manager that cooperates with the SDN controller of information on the attack data flow; reallocating, by the industrial access network system manager, network sources and formulating a corresponding attack mitigation strategy to block continued communications of a DDoS attack source device within the industrial access network; and step S603-4: determining that the DDoS attack is over when the SDN controller reads that $\Delta M$ and $\Delta N$ of the OF switch are both within a normal threshold; deleting the dedicated flow entry for attack mitigation; obtaining, by the controller, topology information; proactively sending flow table modification information to the OF switch to update the flow table, and operating in a mode of passively issuing the flow table.

\* \* \* \* \*